Jan. 1, 1952     G. T. SMITH ET AL     2,580,856

CHEMICAL CAP FOR RADIATORS

Filed June 18, 1949

GEORGE T. SMITH
LOUIS H. MUHDING, JR.
           INVENTORS

BY *Lyon & Lyon*

ATTORNEYS

Patented Jan. 1, 1952

2,580,856

UNITED STATES PATENT OFFICE 2,580,856

CHEMICAL CAP FOR RADIATORS

George T. Smith, Santa Barbara, and Louis Henry Munding, Jr., Maricopa, Calif., assignors, by mesne assignments, to Frank Hornkohl Application June 18, 1949, Serial No. 99,905

2 Claims. (Cl. 210—36)

This invention relates to apparatus for chemically treating water admitted into a radiator for an internal combustion engine.

The cooling systems for internal combustion engines commonly become clogged and inefficient because of deposit of scale and other foreign material within the relatively small openings in the radiator for the cooling system. When the radiator operates inefficiently the engine temperature may increase to the point where the horse power output falls off considerably. The cleaning of cooling systems is often a troublesome and difficult operation. This is particularly true in the case of stationary engines which can be shut down only for a short time, or perhaps not at all. In our copending application for Method and Apparatus for Cleaning Engine Cooling Systems, Serial No. 99,904, filed of even date herewith, we have shown and described apparatus for removing scale and other foreign material from the radiator and cooling passages of an internal combustion engine.

In a new engine or in an engine which has been cleaned by the method or apparatus of said copending application, it is important to prevent initial or continued build-up of scale and other foreign material which lessens the efficiency of the radiator as a heat exchanger.

Accordingly, it is the principal object of this invention to provide improved means for chemically treating water or other coolant as it is added to the circulatory system of a liquid cooled internal combustion engine.

A more detailed object of our invention is to provide a radiator cap structure having a water treating chemical substance incorporated therein so that suitable chemical substances are added to the water at the time it enters the cooling system to inhibit the formation of unwanted scale.

Another object is to provide a device of this type which can readily be attached to existing radiators with a minimum of difficulty.

Another object is to provide a device of this type which includes suitable apertures for escape of vapor and steam, which apertures are also useful as overflow outlets to indicate when the radiator and cooling system are full of coolant.

Another object is to provide a device of this type of relatively short height for reception under the hood of present-day vehicles, and which device employs a chemical cartridge which is toroidal in form.

Another object is to provide a device of this type which is simple and rugged in construction and which requires little or no attention on the part of the person adding water to the engine cooling system.

Other and more detailed objects and advantages will appear hereinafter.

Figure 1:
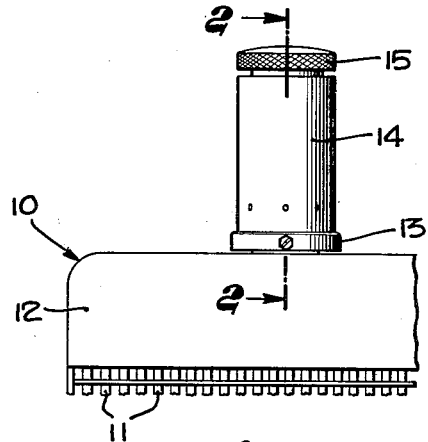
Figure 1 is a front elevation partly broken away showing a preferred embodiment of our invention in position on the inlet port of a radiator for an internal combustion engine.

Referring to the drawings, the radiator 10 for an internal combustion engine (not shown) is provided with the usual heat transfer tubes 11 communicating with the upper chamber 12. The radiator is connected with the cooling passageways in the engine by the usual piping or hose connections (not shown). The radiator inlet pipe 13 communicates with the upper chamber 10 and is secured thereto by any convenient means such as, for example, by welding or brazing.

In accordance with our invention, a cylindrical shell 14 having a removable screw-top closure 15 is releasably connected to the radiator inlet pipe 13. This connection may take any suitable or desirable form, and as shown in the drawings includes a downwardly extending skirt 16 which projects into the open end of the inlet 13. A bar 17 is secured to the lower edge of the skirt, and this bar extends diametrically across the skirt and engages under an annular lip 18 formed on the radiator inlet pipe 13. The lip 18 is not continuous but, on the other hand, is provided with gaps 19 which form entrance slots for the outer ends of the transverse bar 17. A resilient annular washer 19a is positioned between the skirt 16 and the outer circular wall 20 at the lower end of the shell 14. The upper end of the radiator inlet pipe 13 engages this resilient washer 19a and serves to maintain the bar 17 and lip 18 in engagement. Relative rotation between the shell 14 and radiator inlet pipe 13 is prevented by means of a set screw 21 carried on the wall 20 and provided with a lock nut 22. The inner end of the set screw 21 engages the radiator inlet pipe 13.

The wall 20 may be formed integrally with the bottom plate 23 forming the bottom of the shell 14. This bottom plate 23 has a central opening 24 through which coolant passes from the shell to the radiator inlet. A screen 25 may rest on the ring 34 mounted within the shell 14.

A chemical cartridge generally designated 26 may be positioned within the shell 14 and anchored in place by any convenient means. This cartridge 26 rests on the screen 25 and may include a cylindrical cage of wire mesh 27 imbedded within a chemical stick 28. The screen 25 serves to strain out foreign material which may be introduced into the shell inadvertently or along with the coolant. The composition of the chemical stick 28 varies with the type of impurities present in the water which is to be introduced into the engine cooling system. The various chemicals which are employed are well known and form no part of this application.

A plurality of apertures 35 are provided in the wall of the shell 14 at a location below the screen supporting ring 34. These apertures afford escape passages for vapor arising from the surface of the coolant in the radiator and thus prevent the vapors from dissolving the chemical cartridge 26. Furthermore, these apertures 35 act as overflow ports when filling the radiator through the shell 14 and hence provide an indication to the operator when the radiator and cooling system is full of coolant.

In operation the shell 14 is secured to the radiator inlet pipe 13 by inserting the cross-bar 17 into the opposed slots 19 and then turning the shell relative to the inlet pipe 13. The set screw 21 is then used to clamp the shell 14 against rotary motion with respect to the inlet pipe 13. When the cooling system needs additional coolant, the screw cap 15 is removed and water is poured into the shell 14 through the central opening 29. This water impinges directly on the chemical stick 28 and absorbs chemical agents which inhibit the formation of scale. The water passes downwardly through the screen 25 and through the central opening 24 through the inlet 13 and into the upper chamber 12 of the radiator 10. The chemical cartridge 26 remains within the shell at all times so that whenever water is added it is treated initially with chemicals before it enters the engine cooling system. When the chemical stick 28 has been depleted, the entire cartridge 26 may be removed through the opening 29 and replaced as a unit.

Figure 3:
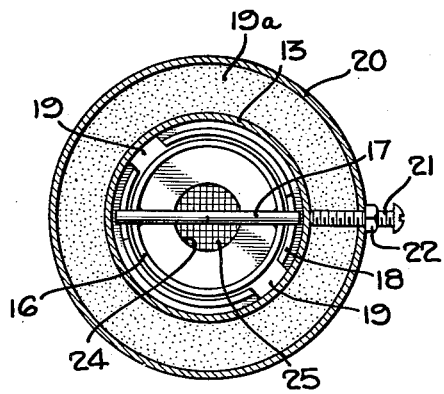
Figure 3 is a transverse sectional elevation taken substantially on the lines 3—3 as shown in Figure 2.
Figure 2:
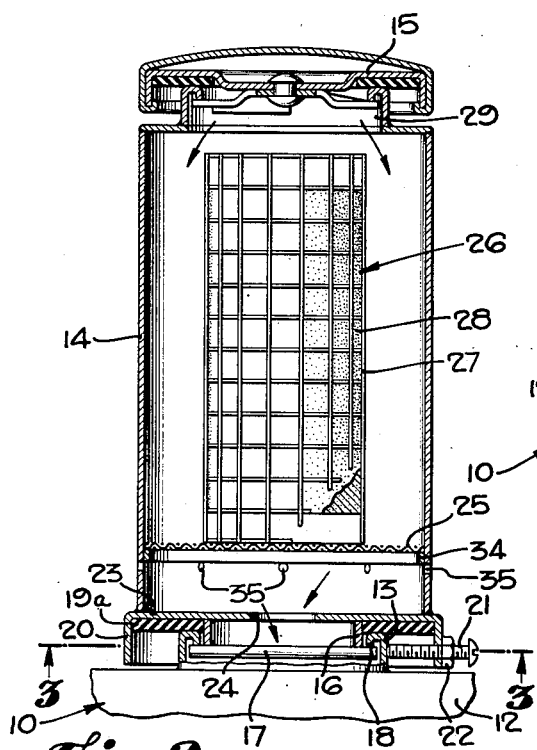
Figure 2 is a sectional elevation partly broken away taken substantially on the lines 2—2 as shown in Figure 1.
Figure 4:
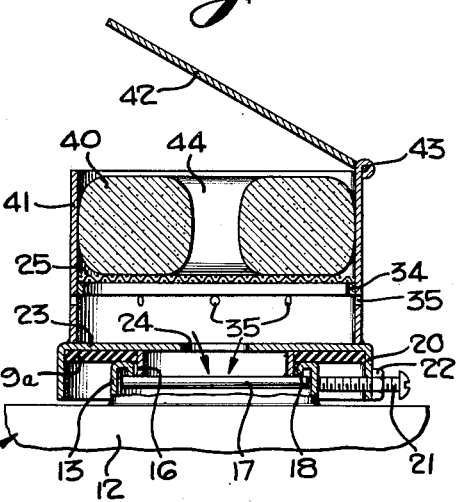
Figure 4 is a transverse sectional view showing a modified form of our invention.
Figure 5:
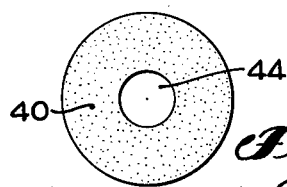
Figure 5 is a plan view of the chemical cartridge employed in connection with the form of our device shown in Figure 4.

In the modified form of our invention shown in Figures 4 and 5, a toroidal or doughnut-shaped chemical cartridge 40 is employed. The cartridge is received within a cylindrical shell 41 provided with a cover 42 hinged at 43. The adapter for attaching the shell 41 to the radiator inlet pipe may be substantially the same as that described in connection with Figures 1 to 3. When water is needed in the cooling system, the hinged cover 42 is raised and water is poured into the central aperture 44 in the chemical cartridge 40. Contact with the chemicals adds chemical agents to the water which inhibit the formation of scale. This modified form of our invention has the advantage of being relatively short in overall height and yet affording a large area for contact with the chemical cartridge. When the cartridge is depleted it may be withdrawn through the opening at the upper end of the shell 41 and replaced by a new one.

The cartridge 40 rests on screen 25 which is supported above the shell bottom 23 by means of the support ring 34. The ports 35 in the wall of the shell below the support ring 34 function as vapor release passageways and overflow ports in the manner described in connection with the device shown in Figures 1 to 3.

Having fully described our invention, it is to be understood that we do not wish to be limited to the details herein set forth, but our invention is of the full scope of the appended claims.

We claim:

1. In a device of the class described adapted to be attached to the inlet pipe of the radiator for an internal combustion engine, the combination of a shell, means for connecting the shell to the radiator inlet pipe, the shell having an inlet opening, a movable closure for said opening, and a chemical cartridge insertable into said shell as a unit through said opening, a screen in the shell above the lower end thereof and below the chemical cartridge, the shell having ports in the wall thereof below the screen acting as vapor release passageways and serving as overflow ports for the coolant, the parts being so arranged that coolant introduced into the opening contacts the chemical cartridge before passing into the radiator.

2. In a device of the class described adapted to be attached to the inlet pipe of the radiator for an internal combustion engine, the combination of a shell, means for connecting one end of the shell to the radiator inlet pipe, the shell having an opening at the other end, a movable closure for said opening, and an annular chemical cartridge insertable into said shell as a unit through said opening, a screen in the shell above the lower end thereof and below the chemical cartridge, the shell having ports in the wall thereof below the screen acting as vapor release passageways and serving as overflow ports for the coolant, the parts being so arranged that at least a portion of a stream of coolant introduced into the opening passes centrally through the chemical cartridge before passing into the radiator.

GEORGE T. SMITH.
LOUIS HENRY MUNDING, Jr.

REFERENCES CITED

The following references are of record in the file of this patent:

UNITED STATES PATENTS

| Number | Name | Date |
|---|---|---|
| 1,680,103 | Hardy | Aug. 7, 1928 |
| 1,855,990 | Saks | Apr. 26, 1932 |
| 1,994,551 | Weis | Mar. 19, 1935 |
| 2,172,951 | Barclay et al. | Sept. 12, 1939 |
| 2,304,453 | Gudmundsen | Dec. 8, 1942 |
| 2,455,240 | Dupler | Nov. 30, 1948 |
| 2,471,142 | Chaffee | May 24, 1949 |

FOREIGN PATENTS

| Number | Country | Date |
|---|---|---|
| 10,394 | Great Britain | Apr. 28, 1910 |
| 16,050 | Great Britain | July 11, 1913 |
| 241,361 | Great Britain | Oct. 22, 1925 |
| 626,413 | France | May 9, 1927 |